United States Patent
Seo et al.

(10) Patent No.: US 10,364,301 B2
(45) Date of Patent: Jul. 30, 2019

(54) MODIFIED ISOBUTYLENE-ISOPRENE RUBBER, PRODUCTION METHOD FOR SAME AND CURED MATERIAL OF SAME

(71) Applicant: LG CHEM, LTD., Seoul (KR)

(72) Inventors: Kwang-Su Seo, Anyang-si (KR); Jang-Soon Kim, Seongnam-si (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 15/542,347

(22) PCT Filed: Jan. 15, 2016

(86) PCT No.: PCT/KR2016/000421
§ 371 (c)(1),
(2) Date: Jul. 7, 2017

(87) PCT Pub. No.: WO2016/122144
PCT Pub. Date: Aug. 4, 2016

(65) Prior Publication Data
US 2018/0273651 A1    Sep. 27, 2018

(30) Foreign Application Priority Data

Jan. 29, 2015  (KR) .................. 10-2015-0014302

(51) Int. Cl.
| | |
|---|---|
| *C08L 13/00* | (2006.01) |
| *C08C 19/28* | (2006.01) |
| *C09J 7/10* | (2018.01) |
| *C09J 123/22* | (2006.01) |
| *C09J 151/06* | (2006.01) |
| *C08L 51/06* | (2006.01) |
| *C09J 113/00* | (2006.01) |

(52) U.S. Cl.
CPC .............. *C08C 19/28* (2013.01); *C08L 13/00* (2013.01); *C08L 51/06* (2013.01); *C09J 7/10* (2018.01); *C09J 123/22* (2013.01); *C09J 151/06* (2013.01); *C08L 2205/03* (2013.01); *C09J 113/00* (2013.01); *C09J 2413/00* (2013.01)

(58) Field of Classification Search
CPC ... C08J 5/18; C08J 7/10; C08J 2413/00; C08J 113/00; C08L 23/22; C08L 13/00; C08L 2205/03; C08C 19/28
See application file for complete search history.

(56) References Cited

U.S. PATENT DOCUMENTS

| | | |
|---|---|---|
| 2006/0223945 A1 | 10/2006 | Hollingshurst |
| 2008/0076879 A1 | 3/2008 | Resendes |
| 2012/0122359 A1 | 5/2012 | Lee |
| 2014/0228521 A1 | 8/2014 | Siegers |

FOREIGN PATENT DOCUMENTS

| | | |
|---|---|---|
| CN | 103201353 A | 7/2013 |
| KR | 10-2008-0023197 A | 3/2008 |
| KR | 10-2013-0119941 A | 11/2013 |
| KR | 10-2014-0080506 A | 6/2014 |
| WO | 03-076537 A1 | 9/2013 |

*Primary Examiner* — Nathan M Nutter
(74) *Attorney, Agent, or Firm* — Dentons US LLP

(57) ABSTRACT

The present invention provides: a modified isobutylene-isoprene rubber including a structural unit of Chemical Formula I, a production method for the same, and a cured material formed by thermally curing the same (in Chemical Formula I, X is an alkyl group including at least two carboxyl groups). The modified isobutylene-isoprene rubber exhibits excellent characteristics in terms of adhesive properties, flexibility, water vapor transmission resistance and transparency.

15 Claims, 1 Drawing Sheet

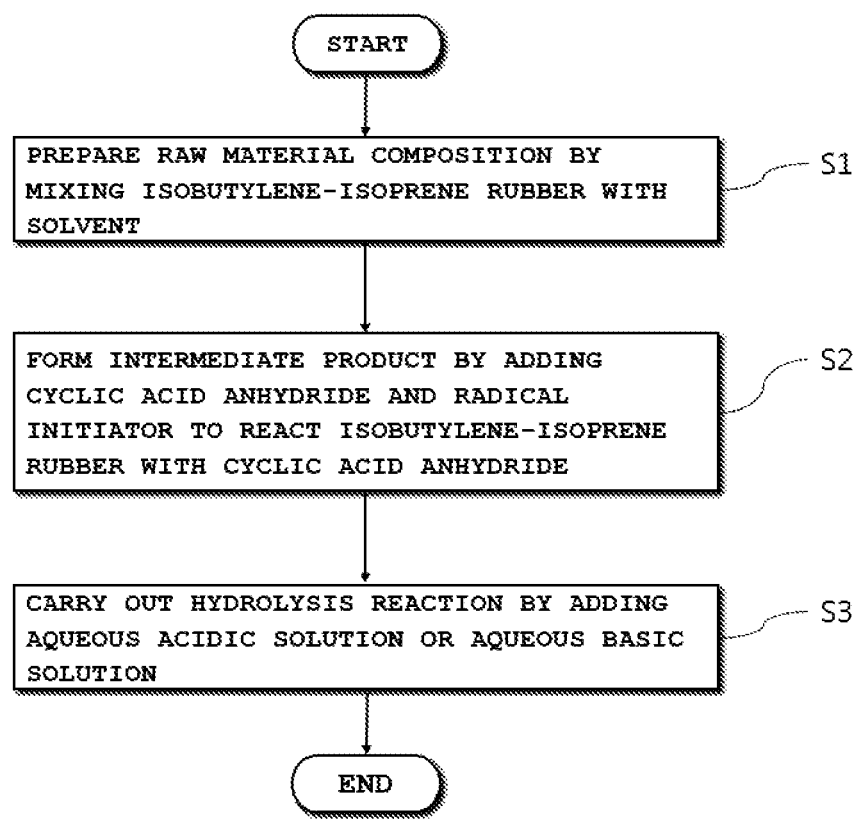

MODIFIED ISOBUTYLENE-ISOPRENE RUBBER, PRODUCTION METHOD FOR SAME AND CURED MATERIAL OF SAME

This application is a National Stage Application of International Application No. PCT/KR2016/000421 filed on Jan. 15, 2016, which claims priority to and the benefit of priority of Korean Patent Application No. 10-2015-0014302 filed on Jan. 29, 2015, all of which are hereby incorporated by reference in their entirety for all purposes as if fully set forth herein.

TECHNICAL FIELD

The present invention relates to a modified isobutylene-isoprene rubber, a production method for the same, and a cured material of the same.

BACKGROUND ART

In general, an isobutylene-isoprene rubber has been used for an adhesive composition and an adhesive sheet due to excellent chemical resistance, excellent water vapor resistance, excellent electrical insulation properties, and the like, but has a problem in that it is difficult to cure the rubber because the rubber contains a small amount of unsaturated bonds.

In order to solve the problem, when the isobutylene-isoprene rubber is cured by carrying out a vulcanization treatment on the rubber, optical characteristics may deteriorate due to the occurrence of a discoloration phenomenon in which colors are changed, and further, there is a problem in that corrosion occurs due to sulfur elements remaining in a product.

Further, the vulcanization treatment process essentially requires a high temperature process and thus has inferior workability and involves risks.

Further, when the isobutylene-isoprene rubber is cross-linked through halogen substitution, the isobutylene-isoprene rubber is harmful to the human body and may cause environmental pollution due to the toxicity of halogen elements.

DETAILED DESCRIPTION OF THE INVENTION

Technical Problem

An exemplary embodiment of the present invention provides a modified isobutylene-isoprene rubber which simultaneously implements excellent adhesive property, excellent transparency, excellent flexibility, and excellent water vapor transmission resistance.

Another exemplary embodiment of the present invention provides a cured material formed by thermally curing a composition including the modified isobutylene-isoprene rubber.

Still another exemplary embodiment of the present invention provides a method for producing the modified isobutylene-isoprene rubber.

However, a technical problem to be achieved by the present invention is not limited to the aforementioned problem, and the other problems that are not mentioned may be clearly understood by the person skilled in the art from the following description.

Technical Solution

An exemplary embodiment of the present invention provides a modified isobutylene-isoprene rubber (IIR) including a structural unit of the following Chemical Formula 1:

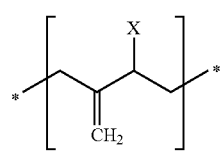

[Chemical Formula 1]

in Chemical Formula 1, X is an alkyl group including at least two carboxyl groups.

In Chemical Formula 1, X may be a functional group represented by the following Chemical Formula 2, a functional group represented by the following Chemical Formula 3, or a functional group represented by the following Chemical Formula 4:

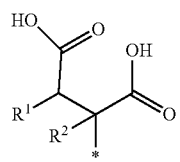

[Chemical Formula 2]

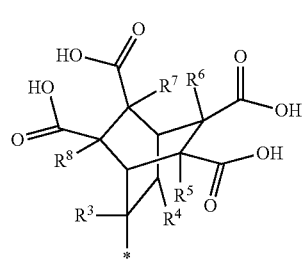

[Chemical Formula 3]

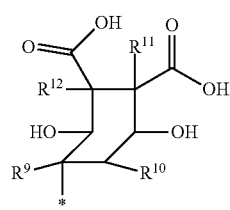

[Chemical Formula 4]

in Chemical Formulae 2 to 4, $R^1$ to $R^{12}$ are each independently a substituted or unsubstituted alkyl group having 1 to 12 carbon atoms; or hydrogen.

The modified isobutylene-isoprene rubber may include about 0.5 mol % to about 5.0 mol % of the structural unit of Chemical Formula 1 in the entire structural units of the modified isobutylene-isoprene rubber.

The modified isobutylene-isoprene rubber may include about 95.0 mol % to about 99.5 mol % of a structural unit of the following Chemical Formula 5 in the entire structural units of the modified isobutylene-isoprene rubber:

[Chemical Formula 5]

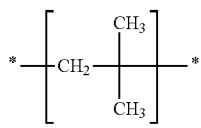

The modified isobutylene-isoprene rubber may not include a sulfur atom and a halogen atom.

The modified isobutylene-isoprene rubber may have a weight average molecular weight of about 10,000 g/mol to about 1,000,000 g/mol.

The modified isobutylene-isoprene rubber may have a glass transition temperature of about −80° C. to about −20° C.

Another exemplary embodiment of the present invention provides a cured material formed by thermally curing a composition including the modified isobutylene-isoprene rubber and a thermo-curing agent.

The cured material may not include a sulfur atom, a halogen atom, and a tackifier.

The composition may further include at least one selected from the group consisting of a cyclic acid anhydride including a carbon-carbon double bond, a polyolefin-based polymer including a cyclic acid anhydride skeleton, carboxylic acid, a polyolefin-based polymer including a carboxyl group, and a combination thereof.

The cured material may have a gel fraction of about 10% or more.

An optical adhesive film may be formed as a cured material by thermally curing the thermosetting composition, and the adhesive film may have an adhesive strength of about 500 g/in to about 6,000 g/in.

Still another exemplary embodiment of the present invention provides a method for producing a modified isobutylene-isoprene rubber (IIR), the method including: preparing a raw material composition by mixing an isobutylene-isoprene rubber with a solvent; forming an intermediate product by adding a cyclic acid anhydride including a carbon-carbon double bond and a radical initiator to the raw material composition to react the isobutylene-isoprene rubber with the cyclic acid anhydride including the carbon-carbon double bond; and carrying out a hydrolysis reaction by adding an aqueous acidic solution or an aqueous basic solution to a raw material composition including the intermediate product.

The cyclic acid anhydride including the carbon-carbon double bond may include at least one selected from the group consisting of a compound represented by the following Chemical Formula 6, a compound represented by the following Chemical Formula 7, a compound represented by the following Chemical Formula 8, and a combination thereof:

[Chemical Formula 6]

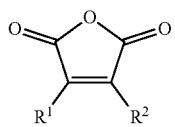

[Chemical Formula 7]

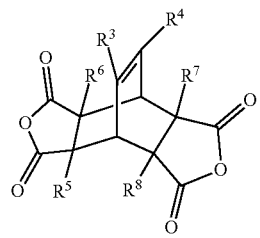

[Chemical Formula 8]

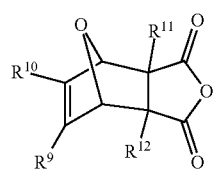

In Chemical Formulae 6 to 8, $R^1$ to $R^{12}$ are each independently a substituted or unsubstituted alkyl group having 1 to 12 carbon atoms; or hydrogen.

The intermediate product may be formed so as to include a structural unit of the following Chemical Formula 9:

[Chemical Formula 9]

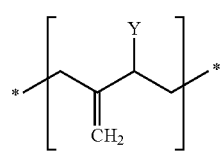

In Chemical Formula 9, Y is a derivative derived from the cyclic acid anhydride including the carbon-carbon double bond.

In Chemical Formula 9, Y may be a functional group represented by the following Chemical Formula 10, a functional group represented by the following Chemical Formula 11, or a functional group represented by the following Chemical Formula 12.

[Chemical Formula 10]

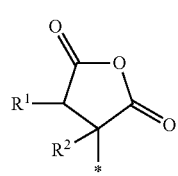

[Chemical Formula 11]

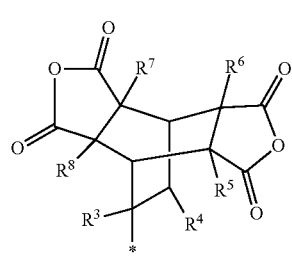

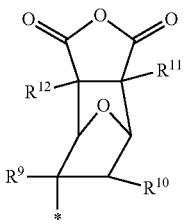

In Chemical Formulae 10 to 12, $R^1$ to $R^{12}$ are each independently a substituted or unsubstituted alkyl group having 1 to 12 carbon atoms; or hydrogen.

The intermediate product may allow the hydrolysis reaction to proceed, and as a result, a modified isobutylene-isoprene rubber including a structural unit of the following Chemical Formula 1 may be produced:

[Chemical Formula 1]

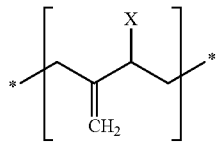

in Chemical Formula 1, X is an alkyl group including at least two carboxyl groups.

In Chemical Formula 1, X may be a functional group represented by the following Chemical Formula 2, a functional group represented by the following Chemical Formula 3, or a functional group represented by the following Chemical Formula 4:

[Chemical Formula 2]

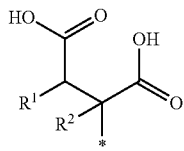

[Chemical Formula 3]

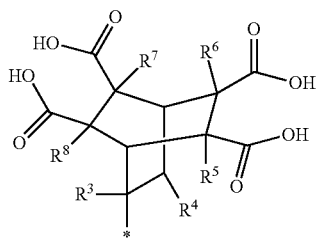

[Chemical Formula 4]

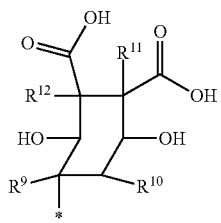

in Chemical Formulae 2 to 4, $R^1$ to $R^{12}$ are each independently a substituted or unsubstituted alkyl group having 1 to 12 carbon atoms; or hydrogen.

In the preparing of the raw material composition, the isobutylene-isoprene rubber may include about 95.0 mol % to about 99.5 mol % of a structural unit of the following Chemical Formula 5 and about 0.5 mol % to about 5.0 mol % of a structural unit of the following Chemical Formula 13:

[Chemical Formula 5]

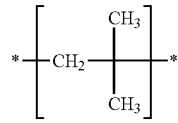

[Chemical Formula 13]

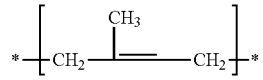

About 0.5 part by weight to about 10 parts by weight of the cyclic acid anhydride including the carbon-carbon double bond may be added to the isobutylene-isoprene rubber based on 100 parts by weight of the isobutylene-isoprene rubber.

For a predetermined time before the cyclic acid anhydride including the carbon-carbon double bond and the radical initiator are added to the raw material composition, nitrogen purging may be carried out.

While the isobutylene-isoprene rubber is reacted with the cyclic acid anhydride including the carbon-carbon double bond, the temperature of the raw material composition may be maintained at about 30° C. to about 250° C.

While the isobutylene-isoprene rubber is reacted with the cyclic acid anhydride including the carbon-carbon double bond, the raw material composition may be stirred at a stirring rate of about 100 rpm to about 300 rpm.

Advantageous Effects

The modified isobutylene-isoprene rubber may simultaneously implement excellent adhesive property, excellent transparency, excellent flexibility, and excellent water vapor transmission resistance.

BRIEF DESCRIPTION OF DRAWINGS

The FIGURE is a schematic process flow-chart of a method for producing a modified isobutylene-isoprene rubber (IIR) according to another exemplary embodiment of the present invention.

BEST MODE

Hereinafter, exemplary embodiments of the present invention will be described in detail. However, the exemplary embodiments are suggested as an example, the present invention is not limited thereby, and the present invention is defined only by the scope of the claims to be described below.

In the present specification, "alkyl group" means, unless otherwise defined, a saturated alkyl group which does not include any alkenyl or alkynyl, and the alkyl group may be branched, straight, or cyclic.

For example, typical examples of the alkyl group include an ethyl group, a propyl group, an iso-propyl group, an n-butyl group, an iso-butyl group, a sec-butyl group, a t-butyl group, an n-pentyl group, an iso-pentyl group, a sec-pentyl group, a hexyl group, an ethenyl group, a propenyl group, a butenyl group, a cyclopropyl group, a cyclobutyl group, a cyclopentyl group, a cyclohexyl group, and the like.

Further, in the present specification, "*" means a moiety linked to the same or different atom(s) or chemical formula (e).

An exemplary embodiment of the present invention provides a modified isobutylene-isoprene rubber (IIR) including a structural unit of the following Chemical Formula 1:

[Chemical Formula 1]

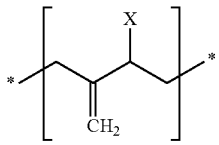

in Chemical Formula 1, X is an alkyl group including at least two carboxyl groups. That is, X is an alkyl group substituted with at least two substituents, and at least two among the substituents are a carboxyl group.

X may include, for example, two to six carboxyl groups, and may include, specifically, two to four carboxyl groups, but is not limited thereto. In addition, X may further include or may not include an alkyl group having 1 to 12 carbon atoms, a hydroxy group, or both the groups as a substituent. When X includes the hydroxy group as a substituent, X may include, for example, two to four hydroxy groups, and may include, specifically, two hydroxy groups, but is not limited thereto.

For X which is the alkyl group including at least two carboxyl groups, the number of carbon atoms of the main chain other than the substituent, that is, the main chain may be, for example, 2 to 20, and may be, specifically, 2 to 10, but is not limited thereto. X may be a branched, straight, or cyclic alkyl group, and when X is the cyclic alkyl group, X may be, for example, a cycloalkyl group or a bicycloalkyl group, and may be, specifically, a cyclohexyl group or a bicyclo[2.2.2]octanyl group.

An unmodified isobutylene-isoprene rubber which is generally used has good chemical resistance, water vapor resistance, electrical insulation properties, adhesive property, viscoelastic property, and the like, but the curing reaction scarcely proceeds due to a small amount of unsaturated bonds, and as a result, a curing reaction is carried out by a vulcanization treatment or halogen substitution, and the like in order to prepare the unmodified isobutylene-isoprene rubber into a product such as an adhesive film and an adhesive sheet.

However, for the vulcanization treatment method, optical properties may deteriorate due to the occurrence of a discoloration phenomenon in which colors are changed, and corrosion and the like may be generated by a sulfur element remaining in a product, and a high temperature process is essentially accompanied, and as a result, the workability is inferior and risks are involved. In addition, when cross-linking proceeds through halogen substitution of isobutylene-isoprene rubber, a halogen element remaining in a product is present in the form of ions, and a result, the isobutylene-isoprene rubber may have a negative effect such as a change in physical properties on electromagnetic parts, and is harmful to the human body and may cause environmental pollution due to the toxicity of halogen elements. Furthermore, when an isobutylene-isoprene rubber is thermally cured by the vulcanization treatment or halogen substitution, the thermo-curing may continuously proceed for a predetermined period of time even after the thermo-curing reaction is completed due to sulfur elements or halogen elements which are highly reactive, and when the isobutylene-isoprene rubber is exposed to UV, a photo-curing reaction may proceed, and as a result, as the time passes, physical properties of the product may be changed.

Meanwhile, an adhesive film, an adhesive sheet, and the like may also be formed by an adhesive composition including an unmodified isobutylene-isoprene rubber and an acrylic resin, which is a photo-curable resin, by mixing the unmodified isobutylene-isoprene rubber with the acrylic resin, but in this case, an adhesive property or an attaching property may deteriorate as compared to the case where the isobutylene-isoprene rubber is used alone.

Thus, in an exemplary embodiment of the present invention, the modified isobutylene-isoprene rubber has advantages in that it is possible to implement excellent adhesive property, excellent transparency, excellent flexibility, and excellent water vapor transmission resistance because it is possible to easily carry out a thermo-curing reaction without performing a high temperature vulcanization treatment process or a toxic halogen substitution, by including an alkyl group which includes at least two carboxyl groups as a thermosetting functional group which may easily carry out a thermo-curing reaction. Specifically, it is possible to implement excellent flexibility at room temperature by including a polar group such as the carboxyl group to improve the adhesive property and simultaneously maintain the glass transition temperature of the modified isobutylene-isoprene rubber at a low level.

Further, it is possible to not only implement excellent workability and eco-friendliness because there is no need for performing a high temperature vulcanization treatment process or a toxic halogen substitution, but also maintain physical properties of a product at a uniform level for a long period of time because thermo-curing scarcely proceeds within the product after the thermo-curing is completed.

Specifically, in Chemical Formula 1, X is a functional group represented by the following Chemical Formula 2, a functional group represented by the following Chemical Formula 3, or a functional group represented by the following Chemical Formula 4, and accordingly, the modified isobutylene-isoprene rubber may include at least one functional group selected from the group consisting of the functional group represented by the following Chemical Formula 2, the functional group represented by the following Chemical Formula 3, the functional group represented by the following Chemical Formula 4, and a combination thereof:

[Chemical Formula 2]

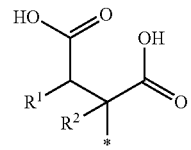

[Chemical Formula 3]

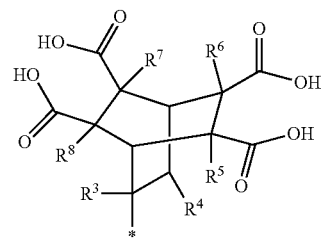

-continued

[Chemical Formula 4]

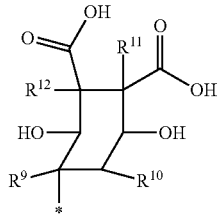

in Chemical Formulae 2 to 4, $R^1$ to $R^{12}$ are each independently a substituted or unsubstituted alkyl group having 1 to 12 carbon atoms; or hydrogen.

When the modified isobutylene-isoprene rubber includes the functional group represented by Chemical Formula 4, not only the carboxyl group, but also the hydroxy group may act as a thermosetting functional group, and accordingly, when a thermosetting composition including the modified isobutylene-isoprene rubber is cured, a selective cross-linking bond may be formed by appropriately using a curing agent having a different reactivity depending on the purpose and use of the invention.

For example, when an isocyanate-based curing agent is used, the hydroxy group has a higher reactivity as a thermosetting functional group than the carboxyl group, and when an aziridine-based curing agent is used, the hydroxy group does not act as a thermosetting functional group, and only the carboxyl group may participate in a thermo-curing reaction as a thermosetting functional group.

The modified isobutylene-isoprene rubber may include at least one among the functional groups represented by Chemical Formula 2 to Chemical Formula 4 by adjusting the functional group in an appropriate content depending on the purpose and use of the invention, and the content is not particularly limited.

In an exemplary embodiment, the structural unit of Chemical Formula 1 may be included in an amount of about 0.5 mol % to about 5.0 mol % in the entire structural units. By including the structural unit of Chemical Formula 1 in a content within the range, it is possible to implement excellent chemical resistance, excellent viscoelastic property, and excellent water vapor transmission resistance while easily carrying out a thermo-curing reaction.

Further, the structural unit of Chemical Formula 5 may be included in an amount of about 95.0 mol % to about 99.5 mol % in the entire structural units. By including the structural unit of Chemical Formula 5 in a content within the range, it is possible to sufficiently carry out a thermo-curing reaction while implementing chemical resistance, viscoelastic property, and water vapor transmission resistance at a sufficiently high level.

[Chemical Formula 5]

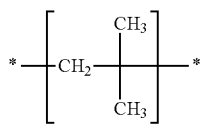

As described above, when the modified isobutylene-isoprene rubber is formed as an adhesive film, and the like by implementing excellent chemical resistance and excellent water vapor transmission resistance, it is possible to uniformly maintain optical properties of a product for a long period of time by preventing the occurrence of bubbles, and the like, and it is possible to further prevent a phenomenon in which the adhesive film is peeled off or lifted from a base material by implementing excellent flexibility due to the high viscoelastic property.

Further, in an exemplary embodiment, the modified isobutylene-isoprene rubber may not include a sulfur atom and a halogen atom. Accordingly, after a thermo-curing reaction is completed by stopping a heat treatment, the thermo-curing does not continuously proceed, and as a result, there is an advantage in that physical properties may be uniformly implemented for a long period of time because a gel fraction, a curing degree, and the like of a cured material may be uniformly maintained.

The modified isobutylene-isoprene rubber may have a weight average molecular weight of, for example, about 10,000 g/mol to about 1,000,000 g/mol. The cross-linking density may be formed at a sufficient level during the thermo-curing while implementing excellent processability by having a weight average molecular weight within the range to adjust the viscosity at an appropriate level.

The modified isobutylene-isoprene rubber may have a glass transition temperature of, for example, about −80° C. to about −20° C. By having a glass transition temperature within the range, a product such as an adhesive film formed by the modified isobutylene-isoprene rubber may stably maintain physical properties at a low temperature of more than about −20° C., and simultaneously, may form the viscoelastic property at room temperature, which is a much higher temperature, at an excellent level, thereby improving the flexibility.

In an exemplary embodiment, a composition including a modified isobutylene-isoprene rubber may be formed as an adhesive film by a thermo-curing reaction, and thus may be applied for a use of an optical adhesive film.

As described above, in an adhesive film formed by the modified isobutylene-isoprene rubber, flexibility is effectively improved so that cracks and the like may not occur even though the adhesive film is warped or bent, and as a result, the adhesive film may be applied for a use of an optical adhesive film applied to, for example, a flexible display device. Accordingly, even though the display device is warped or bent, it is possible to effectively prevent a problem in that the adhesive film is peeled off or lifted from an upper layer and a lower layer while the adhesive film is not damaged.

Another exemplary embodiment of the present invention provides a cured material formed by thermally curing a thermosetting composition including the modified isobutylene-isoprene rubber and a thermo-curing agent. The modified isobutylene-isoprene rubber is the same as that described above in an exemplary embodiment.

Specifically, the cured material may not include a sulfur atom, a halogen atom, and a tackifier.

Typically, in an unmodified isobutylene-isoprene rubber which is generally used, a thermo-curing reaction scarcely proceeds, and as a result, a thermo-curing reaction may be carried out by a high temperature vulcanization treatment or halogen substitution, and the like, or a photo-curing reaction may be carried out by mixing the unmodified isobutylene-isoprene rubber with an acrylic resin which is a photo-curable resin. However, when a photo-curing reaction is carried out, the isobutylene-isoprene rubber may be present in a state of being dispersed in an acrylic cured material.

The high temperature vulcanization treatment process or the toxic halogen substitution, and the like have problems in that optical properties deteriorate, environmental pollution occurs, and the like, and when the isobutylene-isoprene rubber is used in mixture with an acrylic resin which is a photo-curable resin, the adhesive property deteriorates, and as a result, there is a disadvantage in that an adhesive strength at a required level may be implemented only when a tackifier is added.

In another exemplary embodiment, the cured material has an advantage in that excellent adhesive property, excellent viscoelastic property, excellent flexibility, and excellent water vapor transmission resistance may be implemented because a thermo-curing reaction may be easily carried out without carrying out a high temperature vulcanization treatment process, or a toxic halogen substitution.

Further, it is possible to not only implement excellent workability, excellent eco-friendliness, and excellent transparency because there is no need for performing a high temperature vulcanization treatment process or a toxic halogen substitution, but also maintain physical properties of a product at a uniform level for a long period of time because thermo-curing scarcely proceeds within the product after the thermos-curing is completed.

In addition, it is possible to implement adhesive property at an excellent level while the thermosetting composition does not include a tackifier, and simultaneously, it is possible to implement an excellent surface appearance of a product and a uniform performance for a long period of time.

In general, since the tackifier is a low-molecular weight compound, there may occur a migration phenomenon in which the tackifier moves from the inside of the product to the surface of the product, and accordingly, there is a problem in that the surface appearance of a product and the performance of the product may deteriorate because the residue of the adhesive agent, dirt, and the like may be easily generated. The tackifier may mean those publicly known in the art, and may mean, for example, a rosin-based resin, a terpene-based resin, a phenol-based resin, an acrylic resin, and the like.

In another exemplary embodiment, the thermosetting composition may further include at least one selected from the group consisting of a cyclic acid anhydride including a carbon-carbon double bond, a polyolefin-based polymer including a cyclic acid anhydride skeleton, carboxylic acid, a polyolefin-based polymer including a carboxyl group, and a combination thereof, and accordingly, may effectively improve the adhesive property of a cured material formed by the thermosetting composition.

The polyolefin-based polymer including the cyclic acid anhydride skeleton is a polymer formed by polymerizing cyclic acid anhydrides including the carbon-carbon double bond. Further, the carboxylic acid is a hydrolysis product formed as the cyclic acid anhydride including the carbon-carbon double bond is subjected to a hydrolysis reaction, and the polyolefin-based polymer including the carboxyl group is a hydrolysis product formed as the polyolefin-based polymer including the cyclic acid anhydride skeleton is subjected to a hydrolysis reaction.

The cyclic acid anhydride including the carbon-carbon double bond may include at least one selected from the group consisting of, for example, a substituted or unsubstituted maleic acid anhydride; a substituted or unsubstituted bicycloalkene tetracarboxylic acid dianhydride; a substituted or unsubstituted tetrahydrophthalic acid anhydride; and a combination thereof. In addition, the tetrahydrophthalic acid anhydride may further include, for example, an epoxy group as a substituent.

Specifically, the cyclic acid anhydride including the carbon-carbon double bond may include at least one selected from the group consisting of a compound represented by the following Chemical Formula 6, a compound represented by the following Chemical Formula 7, a compound represented by the following Chemical Formula 8, and a combination thereof.

[Chemical Formula 6]

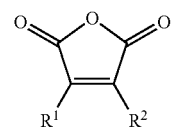

[Chemical Formula 7]

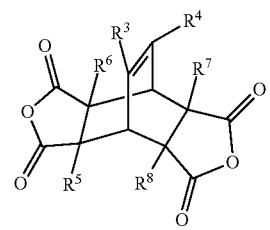

[Chemical Formula 8]

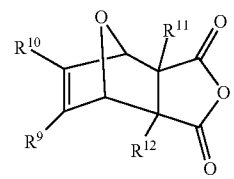

In Chemical Formulae 6 to 8, $R^1$ to $R^{12}$ are each independently a substituted or unsubstituted alkyl group having 1 to 12 carbon atoms; or hydrogen.

In another exemplary embodiment, the thermo-curing agent may include at least one selected from the group consisting of, for example, an isocyanate-based compound, an aziridine-based compound, an epoxy-based compound, a metal chelate-based compound, an amine-based compound, and a combination thereof, but is not limited thereto.

For example, when an isocyanate-based curing agent is used, the hydroxy group has a higher reactivity as a thermosetting functional group than the carboxyl group, and when an aziridine-based curing agent is used, the hydroxy group does not act as a thermosetting functional group, and only the carboxyl group may participate in a thermo-curing reaction as a thermosetting functional group.

Specifically, the thermo-curing agent includes an aziridine-based compound, and thus, may further improve the reactivity of a thermo-curing reaction for a carboxyl group included in a modified isobutylene-isoprene rubber including the structural unit of Chemical Formula 1, and accordingly, the modified isobutylene-isoprene rubber may carry out a thermo-curing reaction more easily.

The thermo-curing reaction may be carried out, for example, at a temperature of about 60° C. to about 150° C. for about 3 minutes to about 180 minutes, but the temperature and time may be appropriately adjusted depending on the purpose and use of the invention, and are not limited thereto.

The composition may further include at least one selected from the group consisting of, for example, an organic solvent, an aromatic cross-linking agent, a silane coupling agent, and a combination thereof, and each of the components may appropriately use those publicly known in the art.

For example, the organic solvent may include at least one selected from the group consisting of toluene, tetrahydrofuran, xylene, chloroform, dimethylsulfoxide, m-cresol, N-methylpyrrolidone, and a combination thereof.

In another exemplary embodiment, a gel fraction of the cured material may be, for example, about 10% or more, and may be specifically about 40% to about 80%. By having a gel fraction within the range, it is possible to easily carry out a thermo-curing reaction without using a high temperature vulcanization treatment process or a toxic halogen substitution, and as a result, it is possible to sufficiently implement physical properties of a product to be implemented, such as adhesive property, viscoelastic property, and workability, and it is possible to appropriately adjust the gel fraction within the range depending on the purpose and use of the invention.

For example, the gel fraction is an index indicating the cross-linking density after curing, is also referred to as a gel content, and may be calculated by the following Equation 1.

$$\text{Gel fraction (\%)} = M_2/M_1 \quad \text{[Equation 1]}$$

In Equation 1, $M_1$ means an initial weight which is a weight prior to immersing a sample, which is obtained by cutting a cured material of which the gel fraction is to be measured into a predetermined size, in a reference solvent, and $M_2$ means a post weight which is a weight of a sample obtained by immersing the sample in a reference solvent and leaving the sample to stand for a predetermined time, and subsequently filtering the sample using a filtration device, and then drying the sample under conditions of a predetermined temperature and a predetermined time.

As the reference solvent, it is possible to use, for example, chloroform, toluene, dichloromethane, cyclohexane, hexane, xylene, and the like, and as the filtration device, it is possible to use, for example, a 300 mesh steel screen, but the examples are not limited thereto.

The time for which the sample is immersed and left to stand in a reference solvent is not particularly limited as long as the other components except for the gel may be dissolved in a reference solvent and separated for the time, the sample may be left to stand for, for example, about 24 hours to about 48 hours, but the time is not limited thereto.

In addition, the conditions of temperature and time, under which a sample obtained by being filtered by means of the filtration device is dried, may be, for example, about 100° C. to about 150° C. and about 1 hour to about 2 hours, but the drying may be appropriately carried out under conditions of temperature and time sufficient for drying the sample, and the conditions are not particularly limited.

In another exemplary embodiment, the cured material may be an optical adhesive film, and specifically, may be an optical adhesive film applied to a flexible display device, and may be, for example, an optically clear adhesive (OCA) film.

The cured material is formed as an optical adhesive film, and the adhesive film may have an adhesive strength of about 500 g/in to about 6,000 g/in. By having an adhesive strength within the range, the adhesive film is stably attached, and as a result, a lifting or peeling phenomenon is further prevented under high temperature and high humidity conditions, thereby implementing both excellent adhesive property and high temperature and high humidity reliability. In addition, when the adhesive film is peeled off during a process of performing re-working by forming the adhesive strength of the adhesive film at an appropriately high level, excellent re-workability may be implemented because the adhesive film may be sufficiently prevented from being damaged.

In the present specification, the adhesive strength adopts, as a reference, a value measured under conditions of a temperature of about 25° C., a peeling speed of about 300 mm/min, and a peeling angle of about 180° with respect to a base material formed of a glass material.

As described above, the cured material may simultaneously implement excellent adhesive property, excellent viscoelastic property, excellent water vapor transmission resistance, and excellent optical properties, and thus, may be easily applied as, for example, an optical adhesive film. Further, when the cured material is applied as an optical adhesive film of a flexible display device, the cured material has appropriately high flexibility, and thus, cracks of the optical adhesive film itself are prevented even when the cured material is warped or bent, and a lifting and peeling phenomenon from an upper layer and a lower layer is effectively prevented, and accordingly, the long-term durability is improved, and as a result, there is an advantage in that uniform physical properties may be maintained for a long period of time in spite of the continuous use of the optical adhesive film.

The flexible display device means a display device which may be warped or bent by using a substrate formed of a plastic material or a metal material, and the like, and may include those publicly known in the art, and is not particularly limited.

The optical adhesive film may have a thickness of about 5 μm to about 50 μm. It is possible to implement optical properties at a sufficiently excellent level and simultaneously implement a sufficient durability and a sufficient attaching property by having a thickness within the range.

The FIGURE is a schematic process flow-chart of a method for producing a modified isobutylene-isoprene rubber (IIR) according to another exemplary embodiment of the present invention.

The production method includes: preparing a raw material composition by mixing an isobutylene-isoprene rubber with a solvent (S1); forming an intermediate product by adding a cyclic acid anhydride including a carbon-carbon double bond and a radical initiator to the raw material composition to react the isobutylene-isoprene rubber with the cyclic acid anhydride including the carbon-carbon double bond (S2); and carrying out a hydrolysis reaction by adding an aqueous acidic solution or an aqueous basic solution to a raw material composition including the intermediate product (S3). By the production method, the modified isobutylene-isoprene rubber described above in an exemplary embodiment may be produced.

The modified isobutylene-isoprene rubber has an advantage in that excellent adhesive property, excellent viscoelastic property, excellent flexibility, and excellent water vapor transmission resistance may be implemented because a thermo-curing reaction may be easily carried out without carrying out a high temperature vulcanization treatment process, or a toxic halogen substitution.

The cyclic acid anhydride including the carbon-carbon double bond may include at least one selected from the group consisting of, for example, a substituted or unsubstituted maleic acid anhydride; a substituted or unsubstituted bicycloalkene tetracarboxylic acid dianhydride; a substituted or unsubstituted tetrahydrophthalic acid anhydride; and a combination thereof. In addition, the tetrahydrophthalic acid anhydride may further include, for example, an epoxy group as a substituent.

Specifically, the cyclic acid anhydride including the carbon-carbon double bond may include at least one selected from the group consisting of a compound represented by the following Chemical Formula 6, a compound represented by the following Chemical Formula 7, a compound represented by the following Chemical Formula 8, and a combination thereof:

[Chemical Formula 6]

[Chemical Formula 7]

[Chemical Formula 8]

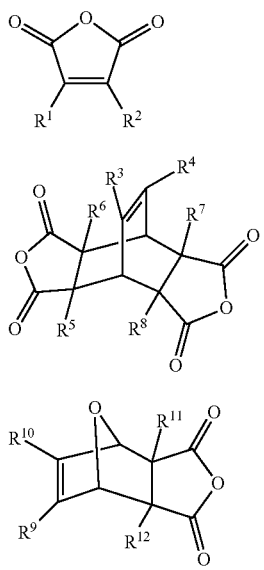

in Chemical Formulae 6 to 8, $R^1$ to $R^{12}$ are each independently hydrogen; or a substituted or unsubstituted alkyl group having 1 to 12 carbon atoms.

In the production method, a raw material composition may be prepared by mixing an isobutylene-isoprene rubber with a solvent.

The isobutylene-isoprene rubber may include about 95 mol % to about 99.5 mol % of a structural unit of the following Chemical Formula 5 and about 0.5 mol % to about 5.0 mol % of a structural unit of the following Chemical Formula 13:

[Chemical Formula 5]

[Chemical Formula 13]

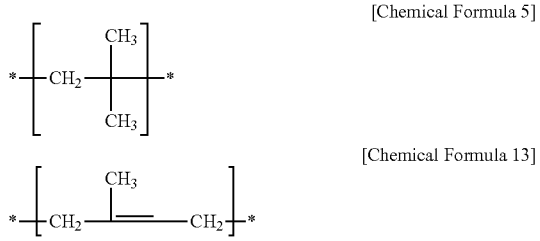

By including the structural units in each content within the range, a modified isobutylene-isoprene rubber, which is formed by the reaction with the cyclic acid anhydride including the carbon-carbon double bond and a subsequent hydrolysis reaction, may sufficiently include a carboxyl group, and accordingly, the modified isobutylene-isoprene rubber may easily carry out a thermo-curing reaction.

The solvent may include at least one selected from the group consisting of, for example, diethyl ether, tetrahydrofuran, dichloromethane, chloromethane, xylene, dimethylformamide, cyclohexane, hexane, chloroform, and a combination thereof.

For a predetermined time before the cyclic acid anhydride including the carbon-carbon double bond and the radical initiator are added to the raw material composition, nitrogen purging may be carried out, and accordingly, a radical formation reaction by the radical initiator may be effectively carried out by removing oxygen or water vapor, and the like dissolved in the raw material composition. When oxygen or water vapor, and the like are included in the raw material composition, oxygen or water vapor, and the like are reacted with formed radicals, and as a result, radicals may be consumed.

Specifically, nitrogen purging may be carried out until an aqueous acidic solution or an aqueous basic solution is added to the raw material composition including the intermediate product before the cyclic acid anhydride including the carbon-carbon double bond and the radical initiator are added to the raw material composition.

An intermediate product may be formed by adding a cyclic acid anhydride including a carbon-carbon double bond and a radical initiator to the raw material composition to react the isobutylene-isoprene rubber with the cyclic acid anhydride including the carbon-carbon double bond.

For example, while the nitrogen purging is continuously carried out, the cyclic acid anhydride including the carbon-carbon double bond is added to the raw material composition, and then a catalyst solution including the radical initiator as a catalyst may be further added thereto. The catalyst solution may be formed, for example, by dissolving the radical initiator in an organic solvent, adding an anhydrous magnesium sulfate thereto, and purifying the resulting mixture.

As described above, it is possible to prevent the isobutylene-isoprene rubber and the radical initiator from being first reacted by first adding the cyclic acid anhydride including the carbon-carbon double bond to the raw material composition, and then adding the catalyst solution to the raw material composition, and accordingly, it is possible to prevent the decomposition of the isobutylene-isoprene rubber or the cross-linking reaction of isobutylene and isoprene.

Further, when the catalyst solution is added to the raw material composition, a reaction of the isobutylene-isoprene rubber and the cyclic acid anhydride including the carbon-carbon double bond is an exothermic reaction, and as a result, the catalyst solution may be slowly added to the raw material composition, and accordingly, the reaction may be stably carried out.

The radical initiator may include at least one selected from the group consisting of, for example, azobisisobutyronitrile (AIBN), benzoyl peroxide (BPO), 2,2'-azobis-(2,4-dimethylvaleronitrile), dicumyl peroxide, and a combination thereof.

Specifically, the radical initiator includes benzoyl peroxide (BPO), dicumyl peroxide, or both benzoyl peroxide (BPO) and dicumyl peroxide, and thus, may further increase the reaction efficiency of the isobutylene-isoprene rubber and the cyclic acid anhydride including the carbon-carbon double bond.

In the production method, for example, the cyclic acid anhydride including the carbon-carbon double bond may be added in an amount of about 0.5 part by weight to about 10 parts by weight, and specifically, about 2 parts by weight to about 10 parts by weight based on 100 parts by weight of the isobutylene-isoprene rubber. By adding the cyclic acid anhydride including the carbon-carbon double bond in a content within the range, it is possible to produce a modified isobutylene-isoprene rubber including the structural unit of Chemical Formula 1 at a level of 0.5 mol % to 5.0 mol % in the entire structural units as described above in an exemplary embodiment, and accordingly, it is possible to implement excellent adhesive property, excellent viscoelastic property, excellent flexibility, and excellent water vapor transmission resistance.

Further, while the isobutylene-isoprene rubber is reacted with the cyclic acid anhydride including the carbon-carbon double bond, the temperature of the raw material composition may be maintained at, for example, about 30° C. to about 250° C. By maintaining the temperature within the range, the isobutylene-isoprene rubber and the cyclic acid anhydride including the carbon-carbon double bond may be reacted with each other at a sufficient rate, and components included in the raw material composition may be prevented from being changed in quality and the workability may be facilitated.

While the isobutylene-isoprene rubber is reacted with the cyclic acid anhydride including the carbon-carbon double bond, the raw material composition may be stirred at a stirring rate of about 100 rpm to about 300 rpm. By stirring the raw material composition at a rate within the range, the isobutylene-isoprene rubber and the cyclic acid anhydride including the carbon-carbon double bond may be reacted with each other at a sufficient rate, and a reaction may uniformly occur throughout the raw material composition.

The time for reacting the isobutylene-isoprene rubber with the cyclic acid anhydride including the carbon-carbon double bond is sufficient as long as the time is a time required for these two components to be reacted, and the time may be, for example, about 1 hour to about 24 hours, but is not limited thereto.

An intermediate product may be formed by reacting the isobutylene-isoprene rubber with the cyclic acid anhydride including the carbon-carbon double bond, and the intermediate product may be formed so as to include a structural unit of the following Chemical Formula 9:

[Chemical Formula 9]

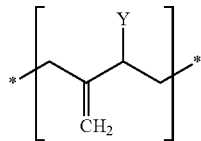

in Chemical Formula 9, Y is a derivative derived from the cyclic acid anhydride including the carbon-carbon double bond. Specifically, Y is a functional group which is derived from the cyclic acid anhydride including the carbon-carbon double bond and thus includes a succinic acid anhydride skeleton.

In Chemical Formula 9, Y is a functional group represented by the following Chemical Formula 10, a functional group represented by the following Chemical Formula 11, or a functional group represented by the following Chemical Formula 12, and the intermediate product may include at least one selected from the group consisting of the functional group represented by the following Chemical Formula 10, the functional group represented by the following Chemical Formula 11, the functional group represented by the following Chemical Formula 12, and a combination thereof:

[Chemical Formula 10]

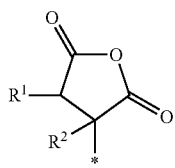

[Chemical Formula 11]

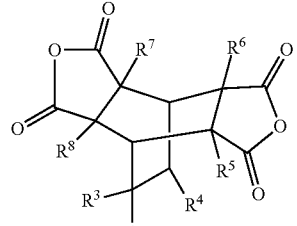

[Chemical Formula 12]

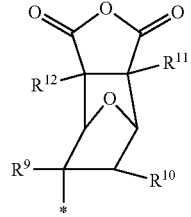

in Chemical Formulae 10 to 12, $R^1$ to $R^{12}$ are each independently a substituted or unsubstituted alkyl group having 1 to 12 carbon atoms; or hydrogen.

In the forming of the intermediate product, a portion of the cyclic acid anhydride including the carbon-carbon double bond may remain as an unreacted cyclic acid anhydride without being reacted with the isobutylene-isoprene rubber, or may form a polyolefin-based polymer including a cyclic acid anhydride skeleton as a polymerization reaction is carried out between the cyclic acid anhydrides including the carbon-carbon double bonds.

Further, in the production method, a hydrolysis reaction may be carried out by adding an aqueous acidic solution or an aqueous basic solution as a catalyst to a raw material composition including the intermediate product.

The aqueous acidic solution may include at least one selected from the group consisting of, for example, an aqueous HCl solution, sulfuric acid, nitric acid, and a combination thereof, the aqueous basic solution may include an aqueous amine-based solution, an aqueous amide-based solution, or both the aqueous amine-based solution and the aqueous amide-based solution, but the aqueous acidic solution and the aqueous basic solution are not limited thereto, and an aqueous solution containing a publicly known acid catalyst or base catalyst used in the hydrolysis reaction in the art may be appropriately used depending on the purpose and use of the invention.

The intermediate product may allow the hydrolysis reaction to proceed, and as a result, a modified isobutylene-isoprene rubber including a structural unit of the following Chemical Formula 1 may be produced:

[Chemical Formula 1]

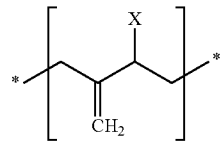

in Chemical Formula 1, X is an alkyl group including at least two carboxyl groups. That is, X is an alkyl group substituted with at least two substituents, and at least two among the substituents are a carboxyl group. X is the same as that described above in an exemplary embodiment.

For example, the aqueous acidic solution or the aqueous basic solution may be added to the raw material composition including the intermediate product after lowering the temperature to about 25° C. to about 50° C., and the aqueous acidic solution or the aqueous basic solution may be slowly added to the raw material composition by using, for example, a dropping funnel.

Specifically, in Chemical Formula 1, X may be a functional group represented by the following Chemical Formula 2, a functional group represented by the following Chemical Formula 3, or a functional group represented by the following Chemical Formula 4.

Accordingly, the modified isobutylene-isoprene rubber may include at least one selected from the group consisting of the functional group represented by the following Chemical Formula 2, the functional group represented by the following Chemical Formula 3, the functional group represented by the following Chemical Formula 4, and a combination thereof:

[Chemical Formula 2]

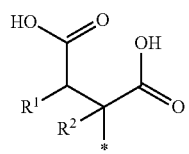

[Chemical Formula 3]

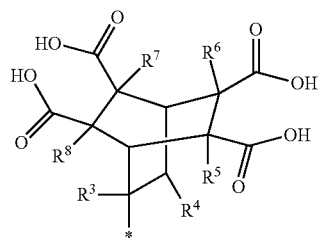

[Chemical Formula 4]

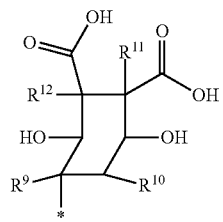

in Chemical Formulae 2 to 4, $R^1$ to $R^{12}$ are each independently hydrogen; or a substituted or unsubstituted alkyl group having 1 to 12 carbon atoms.

Further, in the adding of the aqueous acidic solution or the aqueous basic solution, a portion of the unreacted cyclic acid anhydride may be subjected to a hydrolysis reaction to form carboxylic acid, and a portion of the polyolefin-based polymer including the cyclic acid anhydride skeleton may be subjected to a hydrolysis reaction to form a polyolefin-based polymer including a carboxyl group.

For example, about 40 wt % to about 60 wt % in the total sum of the unreacted cyclic acid anhydride may be subjected to a hydrolysis reaction, and about 40 wt % to about 60 wt % in the total sum of the polyolefin-based polymer including the cyclic acid anhydride skeleton may be subjected to a hydrolysis reaction.

Accordingly, as described above in another exemplary embodiment, a composition including the modified isobutylene-isoprene rubber which is produced may further include at least one selected from the group consisting of a cyclic acid anhydride including a carbon-carbon double bond, a polyolefin-based polymer including a cyclic acid anhydride skeleton, carboxylic acid, a polyolefin-based polymer including a carboxyl group, and a combination thereof, and accordingly, may effectively improve the adhesive property of a cured material formed by the composition.

Further, in the production method, after the modified isobutylene-isoprene rubber is completely produced, water vapor, HCl, and the like may be removed by carrying out nitrogen purging for a predetermined time, and the time for carrying out the nitrogen purging may be appropriately set as a time required for removing water vapor, HCl, and the like, and the time is not particularly limited.

In still another exemplary embodiment, the method may further include: filtering a composition including the modified isobutylene-isoprene rubber including the structural unit of Chemical Formula 1, which is produced, by means of a filter, and the filter may have a pore size of about 1.0 μm to about 10.0 μm. Accordingly, an unreacted cyclic acid anhydride, which is not dissolved in a solvent, and a polyolefin-based polymer having a too large weight average molecular weight may be removed by the filter.

Hereinafter, specific examples of the present invention will be suggested. However, the Examples described below are only provided for specifically exemplifying or explaining the present invention, and the present invention is not limited thereby.

EXAMPLES

Example 1

A raw material composition was prepared by mixing an isobutylene-isoprene rubber (Exxon Mobil, Exxon IIR 268) with a solvent, and nitrogen purging was carried out on the raw material composition for 1 hour.

Subsequently, a maleic acid anhydride as a cyclic acid anhydride including a carbon-carbon double bond was added thereto while continuously carrying out nitrogen purging, and then a radical initiator (benzoyl peroxide, BPO) purified with anhydrous magnesium sulfate was added thereto, the temperature was maintained at 60° C. for 1 hour, and then the temperature was increased to 80° C. and maintained, and the reaction was carried out while stirring the resulting mixture at a stirring rate of 250 rpm for 5 hours in total.

Specifically, 2 parts by weight of the maleic acid anhydride and 1.5 parts by weight of the radical initiator were added to the isobutylene-isoprene rubber based on 100 parts by weight of the isobutylene-isoprene rubber.

Subsequently, the raw material composition was cooled to 50° C., and then a modified isobutylene-isoprene rubber was produced by using a dropping funnel to slowly add 3.1 parts by weight of a 1 N aqueous HCl solution to the raw material composition and allow the resulting mixture to be reacted while stirring the raw material composition.

The modified isobutylene-isoprene rubber included a structural unit of the following Chemical Formula 1, included the structural unit of Chemical Formula 1 in an amount of 1.7 mol % in the entire structural units, and did not include a sulfur atom and a halogen atom.

Further, in the process in which the modified isobutylene-isoprene rubber was produced, a portion of the maleic acid anhydride was not reacted with the isobutylene-isoprene rubber, a polyolefin-based polymer including a succinic acid anhydride skeleton was formed as a polymerization reaction was carried out between the maleic acid anhydrides, and about 40 wt % to about 60 wt % in the total sum of the polyolefin-based polymer including the succinic acid anhydride skeleton was subjected to a hydrolysis reaction by the aqueous HCl solution, and as a result, a polyolefin-based polymer including a carboxyl group was also formed.

Accordingly, the completely reacted composition included all of the modified isobutylene-isoprene rubber, the polyolefin-based polymer including the succinic acid anhydride skeleton, and the polyolefin-based polymer including the carboxyl group.

Example 2 (the Case where the Content of the Acid Anhydride is Higher than that in Example 1)

A modified isobutylene-isoprene rubber was produced in the same conditions and manner as in Example 1, except that 3 parts by weight of the cyclic acid anhydride were added to the isobutylene-isoprene rubber based on 100 parts by weight of the isobutylene-isoprene rubber.

The modified isobutylene-isoprene rubber included a structural unit of the following Chemical Formula 1, included the structural unit of Chemical Formula 1 in an amount of 1.7 mol % in the entire structural units, and did not include a sulfur atom and a halogen atom.

Further, in the process in which the modified isobutylene-isoprene rubber was produced, a portion of the maleic acid anhydride remained as an unreacted maleic acid anhydride without being reacted, or the maleic acid anhydrides were subjected to a polymerization reaction, so that a polyolefin-based polymer including a succinic acid anhydride skeleton was formed, a portion of the unreacted maleic acid anhydride was subjected to a hydrolysis reaction by the aqueous HCl solution to form succinic acid, and a portion of the polyolefin-based polymer was subjected to a hydrolysis reaction to form a polyolefin-based polymer including a carboxyl group.

Accordingly, the completely reacted composition included all of the modified isobutylene-isoprene rubber, an unreacted succinic acid anhydride, the polyolefin-based polymer including the succinic acid anhydride skeleton, succinic acid, and the polyolefin-based polymer including the carboxyl group.

Example 3

A modified isobutylene-isoprene rubber was produced in the same conditions and manner as in Example 2, except that instead of the maleic acid anhydride as the cyclic acid anhydride, bicyclo[2.2.2]oct-7-ene-2,3,5,6-tetracarboxylic acid dianhydride was added.

Example 4

A modified isobutylene-isoprene rubber was produced in the same conditions and manner as in Example 2, except that instead of the maleic acid anhydride as the cyclic acid anhydride, exo-3,6-epoxy-1,2,3,6-tetrahydrophthalic anhydride was added.

Comparative Example 1

An unmodified isobutylene-isoprene rubber (Exxon Mobil, Exxon IIR 268) was prepared.

Experimental Examples

Each composition including the modified isobutylene-isoprene rubber produced according to each of Examples 1 to 4 was allowed to pass through a housing filter having a pore size of 1.0 μm (Chungsoo Technofil Co., Ltd.), thereby obtaining Adhesive Compositions A to D. Thermosetting Compositions A to F and Photo-Curable Composition G were prepared as described below by using Adhesive Compositions A to D and the unmodified isobutylene-isoprene rubber according to Comparative Example 1.

i) Thermosetting Compositions A to D were prepared by further mixing 3.0 parts by weight of an aziridine thermo-curing agent (N,N'-bismethylene imino isophthalamide) (manufactured by LG HAUSYS, LTD.) based on 100 parts by weight of the modified isobutylene-isoprene rubber with each of Adhesive Compositions A to D and stirring the resulting mixtures.

ii) Thermosetting Composition E was prepared by mixing and stirring 100 parts by weight of the unmodified isobutylene-isoprene rubber according to Comparative Example 1, 3.0 parts by weight of an aziridine thermo-curing agent (N,N'-bismethylene imino isophthalamide, manufactured by LG HAUSYS, LTD.), and a toluene solvent.

iii) Thermosetting Composition F was prepared by mixing and stirring 100 parts by weight of the unmodified isobutylene-isoprene rubber according to Comparative Example 1, 3.0 parts by weight of a radical initiator (benzoyl peroxide, BPO), 4.5 parts by weight of a trifunctional sulfur-containing curing agent (trimethylolpropane tris(2-mercaptoacetate), Aldrich) and a toluene solvent.

iv) Photo-curable Composition G was prepared by mixing and stirring 100 parts by weight of the unmodified isobutylene-isoprene rubber according to Comparative Example 1, 10 parts by weight of an acrylic monomer (tricyclodecane dimethanol diacrylate), 0.35 part by weight of a photo-initiator (Irgacure 651), and a toluene solvent.

Subsequently, whether thermo-curing proceeded was evaluated by subjecting Thermosetting Compositions A to F to a heat treatment at a temperature of 120° C. for 3 minutes, and when the thermo-curing proceeded, physical properties of each thermo-cured material formed were evaluated, and the results are shown in the following Table 1.

Further, whether photo-curing proceeded was evaluated by irradiating Photo-Curable Composition G with UV of 5 mW/cm$^2$ by means of a metal halide lamp, and when the photo-curing proceeded, physical properties of a formed photo-cured material are also shown in the following Table 1.

Evaluation Method (Whether Thermo-Curing or Photo-curing Reaction Proceeds)

Measurement Method: For Thermosetting Compositions A to F and Photo-Curable Composition G, whether the thermo-curing reaction proceeded was observed by the unaided eye.

When the liquid state was maintained as it is because a gel was not formed, it was evaluated that a thermo-curing reaction did not proceed and the case was marked with "X", and when a gel was formed, it was evaluated that a thermo-curing reaction proceeded and the case was marked with "O".

(Gel Fraction)

Measurement Method: A gel fraction was calculated according to the following Equation 1.

$$\text{Gel fraction (\%)} = W_2/W_1 \qquad \text{[Equation 1]}$$

In Equation 1, $W_1$ means an initial weight which is a weight prior to immersing a sample, which is obtained by cutting a cured material of which the gel fraction is to be measured into a predetermined size, in a solvent, and $W_2$ means a post weight which is a weight of a sample obtained by immersing the sample in a solvent and leaving the sample to stand for a predetermined time, and subsequently filtering the sample using a filtration device, and then drying the sample under conditions of a predetermined temperature and a predetermined time.

Measurement Conditions: the solvent (toluene), the filtration device (a 300 mesh steel screen), the time for immersing the sample in the solvent and leaving the sample to stand (24 hours), and the temperature and time for drying a sample obtained by being filtered by the filtration device (150° C., 1 hour)

(Whether Physical Properties are Changed)

Measurement Method: According to whether the thermo-curing or photo-curing reaction proceeded, an initial gel fraction was obtained by calculating a gel fraction according to Equation 1 from the time point when each of the thermo-cured materials and the photo-cured materials prepared was produced to the time point when each of the thermo-cured materials and the photo-cured material produced was left to stand at 25° C. for 3 hours, and a post gel fraction was also obtained by calculating a gel fraction according to Equation 1 from the time point when each of the thermo-cured materials and the photo-cured material was produced to the time point when each of the thermo-cured materials and the photo-cured material was left to stand at 25° C. for 24 hours.

A difference between the initial gel fraction and the post gel fraction was calculated by substituting the following Equation 2 with the gel fractions, and when the difference between the gel fractions was 5% or less, it was evaluated that the physical properties were uniformly maintained and the case was marked with "O", and when the difference between the gel fractions was more than 5%, it was evaluated that the physical properties were not uniformly maintained and the case was marked with "X".

Difference (%) between gel fractions=Post gel fraction−Initial gel fraction [Equation 2]

(Presence of Discoloration)

Measurement Method: By observing the color of each of the thermo-cured materials and the photo-cured material by the unaided eye, the case where the color was changed into a yellow color was marked with "O", and the case where the color was maintained as a colorless transparent state which is the same as the color of the composition and thus the color was not changed was marked with "X".

(Light Transmittance and Haze)

Measurement Method: Optical adhesive films having a thickness of 50 μm were manufactured by thermally curing Thermosetting Compositions A to F at a temperature of 120° C. for 3 minutes, and an optical adhesive film having a thickness of 50 μm was manufactured by irradiating Photo-Curable Composition G with UV of 5 mJ/cm$^2$.

Subsequently, for each optical film, the light transmittance and haze were measured by using a Haze-Gard Plus instrument (BYK-Gardner) in accordance with ASTM D1003-97, and the measured light transmittance and haze are described in the following Table 2.

(Adhesive Strength)

Measurement Method: Each sample was prepared by cutting each optical adhesive film, which was manufactured by the methods for measuring the light transmittance and the haze, into a width of 1 inch and a length of 180 mm.

Each sample was attached to a base material formed of a glass material having a size of 80 mm×180 mm, the base material plate was reciprocally compressed 5 times by means of a 2 Kg-rubber roll, and then bubbles were removed, each sample was left to stand for 30 minutes under conditions of 60° C. and 5 bar in an autoclave, and subsequently, the adhesive strength was measured by using a small force tensile tester (Texture Analyzer, TA instrument).

Adhesive Strength Measurement Conditions: a temperature of 25° C., a peeling rate of 300 mm/min, and a peeling angle of 180°

TABLE 1

|  | Whether thermocuring reaction proceeds | Gel fraction (%) | Whether physical properties are changed (difference (%) between gel fractions) | Presence of discoloration |
|---|---|---|---|---|
| Example 1 (Thermosetting Composition A) | O | 55 | X(5) | X |
| Example 2 (Thermosetting Composition B) | O | 73 | X(5) | X |
| Example 3 (Thermosetting Composition C) | O | 10 | X(2) | X |
| Example 4 (Thermosetting Composition D) | O | 52 | X(5) | X |
| Comparative Example 1 (Thermosetting Composition E) | X | 0 | — | — |
| (Thermosetting Composition F) | O | 15 | O(12) | O |
| (Photo-Curable Composition G) | O | 68 | X(0) | X |

TABLE 2

|  | Light transmittance (%) | Haze (%) | Adhesive strength (g/in) |
|---|---|---|---|
| Example 1 (Thermosetting Composition A) | 92.3 | 1.98 | 1800 |
| Example 2 (Thermosetting Composition B) | 92.1 | 2.86 | 2200 |
| Example 3 (Thermosetting Composition C) | 91.7 | 3.75 | 4800 |
| Example 4 (Thermosetting Composition D) | 92.4 | 2.80 | 2100 |
| Comparative Example 1 (Thermosetting Composition E) | — | — | — |
| (Thermosetting Composition F) | 91.2 | 14.0 | 350 |
| (Photo-Curable Composition G) | 92.7 | 0.57 | 360 |

Through Tables 1 and 2, it could be confirmed that in the case of Thermosetting Compositions A to D including the modified isobutylene-isoprene rubbers according to Examples 1 to 4, the thermo-curing reaction was easily carried out, the gel fraction was 10% or more, the light transmittance was 90% or more, and simultaneously, the haze was 3.75% or less, and accordingly, excellent optical properties were implemented. Further, it could be clearly confirmed that discoloration did not occur while maintaining uniform physical properties because the change in physical properties was much smaller than those of the other Examples.

In contrast, it was clearly confirmed that in the case of Thermosetting Composition E including the isobutylene-isoprene rubber according to Comparative Example 1, the thermo-curing reaction did not proceed, and in the case of Thermosetting Composition F including the isobutylene-isoprene rubber according to Comparative Example 1, the thermo-curing reaction proceeded well, but the change in physical properties was significantly large, a yellowing phenomenon occurred, and as a result, optical properties were inferior because the haze was 14%, which was significantly high. In addition, it was clearly confirmed that in the case of Photo-Curable Composition G including the isobutylene-isoprene rubber according to Comparative Example 1, optical properties were good, but there was a problem in that the adhesive strength was significantly low.

The invention claimed is:

1. A modified isobutylene-isoprene rubber (IIR) comprising a structural unit of the following Chemical Formula 1:

[Chemical Formula 1]

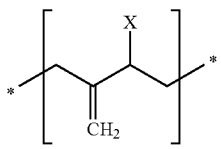

Chemical Formula 1 wherein in Chemical Formula 1, X is a functional group represented by the following Chemical Formula 3:

[Chemical Formula 3]

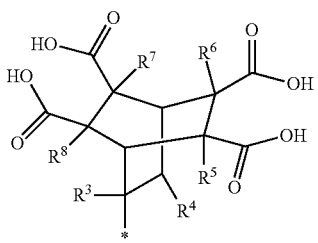

wherein in Chemical Formula 3, $R^3$ to $R^8$ are each independently a substituted or unsubstituted alkyl group having 1 to 12 carbon atoms; or hydrogen.

2. The modified isobutylene-isoprene rubber of claim 1, wherein the modified isobutylene-isoprene rubber comprises 0.5 mol % to 5.0 mol % of the structural unit of Chemical Formula 1 in the entire structural units of the modified isobutylene-isoprene rubber.

3. The modified isobutylene-isoprene rubber of claim 1, wherein the modified isobutylene-isoprene rubber comprises 95.0 mol % to 99.5 mol % of a structural unit of the following Chemical Formula 5 in the entire structural units of the modified isobutylene-isoprene rubber:

[Chemical Formula 5]

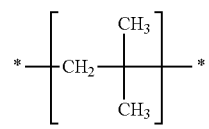

4. The modified isobutylene-isoprene rubber of claim 1, wherein the modified isobutylene-isoprene rubber does not comprise a sulfur atom and a halogen atom.

5. A cured material formed by thermally curing a thermosetting composition comprising the modified isobutylene-isoprene rubber of claim 1 and a thermo-curing agent.

6. The cured material of claim 5, wherein the cured material does not include a sulfur atom, a halogen atom, and a tackifier.

7. The cured material of claim 5, wherein the composition further comprises at least one selected from the group consisting of a cyclic acid anhydride comprising a carbon-carbon double bond, a polyolefin-based polymer comprising a cyclic acid anhydride skeleton, carboxylic acid, a polyolefin-based polymer comprising a carboxyl group, and a combination thereof.

8. The cured material of claim 5, wherein the cured material has a gel fraction of 10% or more.

9. The cured material of claim 5, wherein an optical adhesive film is formed as a cured material by thermally curing the thermosetting composition, and the adhesive film has an adhesive strength of 500 g/in to 6,000 g/in.

10. A method for producing a modified isobutylene-isoprene rubber (IIR), the method comprising:
preparing a raw material composition by mixing an isobutylene-isoprene rubber with a solvent;
forming an intermediate product by adding a cyclic acid anhydride comprising a carbon-carbon double bond and a radical initiator to the raw material composition to react the isobutylene-isoprene rubber with the cyclic acid anhydride comprising the carbon-carbon double bond; and
carrying out a hydrolysis reaction by adding an aqueous acidic solution or an aqueous basic solution to a raw material composition comprising the intermediate product,
wherein the cyclic acid anhydride comprising the carbon-carbon double bond comprises a compound represented by the following Chemical Formula 7:

[Chemical Formula 7]

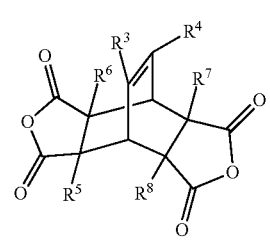

wherein in Chemical Formula 7, $R^3$ to $R^8$ are each independently hydrogen; or a substituted or unsubstituted alkyl group having 1 to 12 carbon atoms.

11. The method of claim 10, wherein the intermediate product is formed so as to comprise a structural unit of the following Chemical Formula 9:

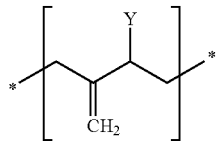
[Chemical Formula 9]

wherein in Chemical Formula 9, Y is a derivative derived from the cyclic acid anhydride represented by Chemical Formula 7.

12. The method of claim 10, wherein the intermediate product may allow the hydrolysis reaction to proceed, so that a modified isobutylene-isoprene rubber comprising a structural unit of the following Chemical Formula 1 is produced:

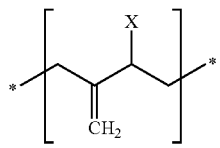
[Chemical Formula 1]

wherein in Chemical Formula 1, X is a a functional group represented by the following Chemical Formula 3:

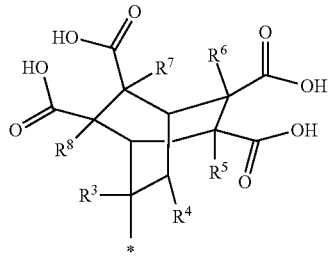
[Chemical Formula 3]

wherein in Chemical Formula 3, $R^3$ to $R^8$ are each independently a substituted or unsubstituted alkyl group having 1 to 12 carbon atoms; or hydrogen.

13. The method of claim 10, wherein in the preparing of the raw material composition, the isobutylene-isoprene rubber comprises 95.0 mol % to 99.5 mol % of a structural unit of the following Chemical Formula 5 and 0.5 mol % to 5.0 mol % of a structural unit of the following Chemical Formula 13:

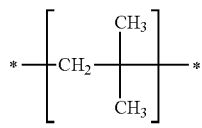
[Chemical Formula 5]

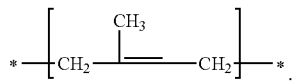
[Chemical Formula 13]

14. The method of claim 10, wherein 0.5 part by weight to 10 parts by weight of the cyclic acid anhydride comprising the carbon-carbon double bond is added to the isobutylene-isoprene rubber based on 100 parts by weight of the isobutylene-isoprene rubber.

15. The method of claim 10, wherein for a predetermined time before the cyclic acid anhydride comprising the carbon-carbon double bond and the radical initiator are added to the raw material composition, nitrogen purging is carried out.

* * * * *